United States Patent
Sharma

(10) Patent No.: US 11,483,595 B2
(45) Date of Patent: Oct. 25, 2022

(54) SYSTEMS AND METHODS FOR FACILITATING SEAMLESS FLOW CONTENT SPLICING

(71) Applicant: DISH Technologies L.L.C., Englewood, CO (US)

(72) Inventor: Abhijit Sharma, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 42 days.

(21) Appl. No.: 17/067,422

(22) Filed: Oct. 9, 2020

(65) Prior Publication Data

US 2021/0029390 A1    Jan. 28, 2021

Related U.S. Application Data

(63) Continuation of application No. 16/152,068, filed on Oct. 4, 2018, now Pat. No. 10,820,019, which is a continuation of application No. 15/589,202, filed on May 8, 2017, now Pat. No. 10,123,058.

(51) Int. Cl.
| | |
|---|---|
| *H04N 21/234* | (2011.01) |
| *H04N 21/81* | (2011.01) |
| *H04N 21/44* | (2011.01) |
| *H04N 21/433* | (2011.01) |
| *H04N 21/462* | (2011.01) |
| *H04N 21/439* | (2011.01) |

(52) U.S. Cl.
CPC ... *H04N 21/23424* (2013.01); *H04N 21/4331* (2013.01); *H04N 21/4394* (2013.01); *H04N 21/44008* (2013.01); *H04N 21/44016* (2013.01); *H04N 21/4622* (2013.01); *H04N 21/812* (2013.01)

(58) Field of Classification Search
CPC ......... H04N 21/23424; H04N 21/4331; H04N 21/4394; H04N 21/44008; H04N 21/44016; H04N 21/4622; H04N 21/812
USPC .......................................................... 725/32
See application file for complete search history.

(56) References Cited

U.S. PATENT DOCUMENTS

| | | |
|---|---|---|
| 9,549,226 B2 | 1/2017 | Quan et al. |
| 10,123,058 B1 | 11/2018 | Sharma |
| 10,820,019 B2 | 10/2020 | Sharma |

(Continued)

*Primary Examiner* — Nathan J Flynn
*Assistant Examiner* — Caroline Somera
(74) *Attorney, Agent, or Firm* — Kilpatrick Townsend & Stockton LLP

(57) ABSTRACT

Systems, methods, machine-readable media, and media device are provided to facilitate seamless flow content splicing to dynamically insert particularized content items in television programming content. A plurality of particularized content items may be received and stored in a content store. First content that corresponds to television programming may be received and processed to detect a first set of color characteristics of video content. A subset of the particularized content items may be selected based on matching a second set of color characteristics of the subset of the particularized content items to the first set of color characteristics of the video content corresponding to the television programming. The first content may be output for display. Then, the subset of the particularized content items may be output for display in succession so that display of the subset of the particularized content items directly follows display of the first content.

14 Claims, 5 Drawing Sheets

(56) References Cited

U.S. PATENT DOCUMENTS

| | | |
|---|---|---|
| 2002/0083473 A1 | 6/2002 | Agnihotri et al. |
| 2003/0174837 A1* | 9/2003 | Candelore ........ H04N 21/26606 380/210 |
| 2004/0143661 A1 | 7/2004 | Higashi et al. |
| 2004/0210928 A1 | 10/2004 | Hamzy et al. |
| 2004/0255150 A1 | 12/2004 | Sezan et al. |
| 2005/0137958 A1 | 6/2005 | Huber et al. |
| 2005/0149968 A1 | 7/2005 | Konig et al. |
| 2006/0195866 A1 | 8/2006 | Thukral |
| 2006/0212897 A1* | 9/2006 | Li ................. H04N 7/17336 725/32 |
| 2007/0101360 A1 | 5/2007 | Gutta et al. |
| 2008/0235226 A1 | 9/2008 | Friedman |
| 2008/0276266 A1* | 11/2008 | Huchital .......... H04N 21/23418 725/32 |
| 2008/0301737 A1 | 12/2008 | Hjelmeland Almas et al. |
| 2009/0055557 A1 | 2/2009 | Namai et al. |
| 2009/0089164 A1 | 4/2009 | Hengel et al. |
| 2009/0172030 A1 | 7/2009 | Schiff et al. |
| 2009/0234649 A1 | 9/2009 | Goodhew |
| 2009/0328125 A1 | 12/2009 | Gits et al. |
| 2010/0153993 A1 | 6/2010 | Konig et al. |
| 2011/0029540 A1 | 2/2011 | Ptucha et al. |
| 2011/0179445 A1 | 7/2011 | Brown et al. |
| 2011/0211812 A1 | 9/2011 | Tzoukermann et al. |
| 2012/0117583 A1 | 5/2012 | Gunatilake |
| 2013/0133003 A1 | 5/2013 | Goldschmidt Iki et al. |
| 2013/0148884 A1 | 6/2013 | Lee |
| 2013/0247083 A1* | 9/2013 | Impollonia ........ G06Q 30/0275 725/14 |
| 2014/0089958 A1 | 3/2014 | Nichols et al. |
| 2014/0133695 A1 | 5/2014 | Lienhart et al. |
| 2014/0153753 A1 | 6/2014 | Crockett |
| 2014/0161423 A1 | 6/2014 | Tesch et al. |
| 2014/0164507 A1 | 6/2014 | Tesch et al. |
| 2015/0082331 A1 | 3/2015 | Neumeier et al. |
| 2015/0375117 A1 | 12/2015 | Thompson et al. |
| 2016/0140224 A1 | 5/2016 | Jin et al. |
| 2016/0196270 A1 | 7/2016 | Dimaria et al. |
| 2016/0379274 A1 | 12/2016 | Irwin et al. |
| 2017/0115954 A1 | 4/2017 | Innes et al. |
| 2017/0264934 A1 | 9/2017 | Guo et al. |
| 2017/0270562 A1 | 9/2017 | Ben-Rubi et al. |
| 2018/0014053 A1 | 1/2018 | Venkatraman et al. |
| 2018/0082127 A1 | 3/2018 | Carlson et al. |
| 2018/0324473 A1 | 11/2018 | Sharma |
| 2019/0116398 A1 | 4/2019 | Sharma |
| 2019/0166403 A1 | 5/2019 | Yelton et al. |

\* cited by examiner

SYSTEMS AND METHODS FOR FACILITATING SEAMLESS FLOW CONTENT SPLICING

CROSS-REFERENCES TO RELATED APPLICATIONS

This application is a continuation of U.S. patent application Ser. No. 16/152,068, filed on Oct. 4, 2018, which is a continuation of U.S. patent application Ser. No. 15/589,202, filed on May 8, 2017, the disclosure of which is hereby incorporated by reference in its entirety for all purposes.

BACKGROUND

This disclosure generally relates to television content handling. Users of televisions and other video distribution platforms are now exposed to more varying types of content than ever before. However, with the proliferation of different content, a viewer can encounter a number of difficulties. Chief among the difficulties is a disconnected user experience when the user views changes in content. The changes in content often result in the user not being able to experience different content seamlessly, which can negatively impact the user's enjoyment. The lack of a relationship between different content items must be solved so as to allow users to better experience different content.

Thus, there is a need for systems and methods that address the foregoing problems in order to provide viewers with better, more tailored viewer experiences. This and other needs are addressed by the present disclosure.

BRIEF SUMMARY

Certain embodiments of the present disclosure relate generally to television content handling, and more particularly to systems and methods for facilitating seamless flow content splicing.

In one aspect, a method for seamless flow content splicing to dynamically insert particularized content items in television programming content is disclosed. The method may include performing one or a combination of the following with a media device. A plurality of particularized content items may be received. The plurality of particularized content items may be stored in a content store. First content that corresponds to television programming may be received. The first content may be processed to detect a first set of one or more color characteristics of video content. The first content may include the video content. A subset of the plurality of particularized content items may be selected based at least in part on matching a second set of one or more color characteristics of the subset of the plurality of particularized content items to the first set of one or more color characteristics of the video content corresponding to the television programming. The first content may be output for display. Then, the subset of the plurality of particularized content items may be output for display in succession so that display of the subset of the plurality of particularized content items directly follows display of the first content.

In another aspect, a media device to facilitate seamless flow content splicing to dynamically insert particularized content items in television programming content is disclosed. The media device may include one or more processors. The media device may include a memory communicatively coupled with and readable by the one or more processors and having stored therein processor-readable instructions which, when executed by the one or more processors, cause the one or more processors to perform one or a combination of the following. A plurality of particularized content items may be received. The plurality of particularized content items may be stored in a content store. First content that corresponds to television programming may be received. The first content may be processed to detect a first set of one or more color characteristics of video content. The first content may include the video content. A subset of the plurality of particularized content items may be selected based at least in part on matching a second set of one or more color characteristics of the subset of the plurality of particularized content items to the first set of one or more color characteristics of the video content corresponding to the television programming. The first content may be output for display. Then, the subset of the plurality of particularized content items may be output for display in succession so that display of the subset of the plurality of particularized content items directly follows display of the first content.

In yet another aspect, one or more non-transitory, machine-readable media are disclosed. The one or more non-transitory, machine-readable media may have instructions thereon which, when executed by one or more processing devices, cause the one or more processing devices to perform one or a combination of the following. A plurality of particularized content items may be received. The plurality of particularized content items may be stored in a content store. First content that corresponds to television programming may be received. The first content may be processed to detect a first set of one or more color characteristics of video content. The first content may include the video content. A subset of the plurality of particularized content items may be selected based at least in part on matching a second set of one or more color characteristics of the subset of the plurality of particularized content items to the first set of one or more color characteristics of the video content corresponding to the television programming. The first content may be output for display. Then, the subset of the plurality of particularized content items may be output for display in succession so that display of the subset of the plurality of particularized content items directly follows display of the first content.

In various embodiments, the first content may correspond to a scene of the television programming that is directly before a commercial break. In various embodiments, the subset of the plurality of particularized content items may correspond to a single commercial. In various embodiments, the second set of one or more color characteristics of the subset may correspond to an initial portion of the single commercial.

In various embodiments, the first content may be processed to detect a first set of one or more acoustic characteristics of audio content. The first content may include the audio content. The selecting the subset of the plurality of particularized content items may be further based at least in part on matching a second set of one or more acoustic characteristics of the subset of the plurality of particularized content items to the first set of one or more acoustic characteristics of the audio content corresponding to the television programming.

In various embodiments, the first content may be processed to detect a first set of one or more dialogue characteristics of the audio content. The selecting the subset of the plurality of particularized content items may be further based at least in part on matching a second set of one or more dialogue characteristics of the subset of the plurality of particularized content items to the first set of one or more dialogue characteristics of the audio content corresponding to the television programming.

In various embodiments, a second subset of the plurality of particularized content items may be selected based at least in part on matching a third set of one or more characteristics of the second subset of the plurality of particularized content items to at least one of the second set of one or more color characteristics, the second set of one or more acoustic characteristics, and/or the second set of one or more dialogue characteristics of subset of the plurality of particularized content items. The second subset of the plurality of particularized content items may be output in succession to the subset of the plurality of particularized content items so that display of the second subset of the plurality of particularized content items directly follows display of the subset of the plurality of particularized content items.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
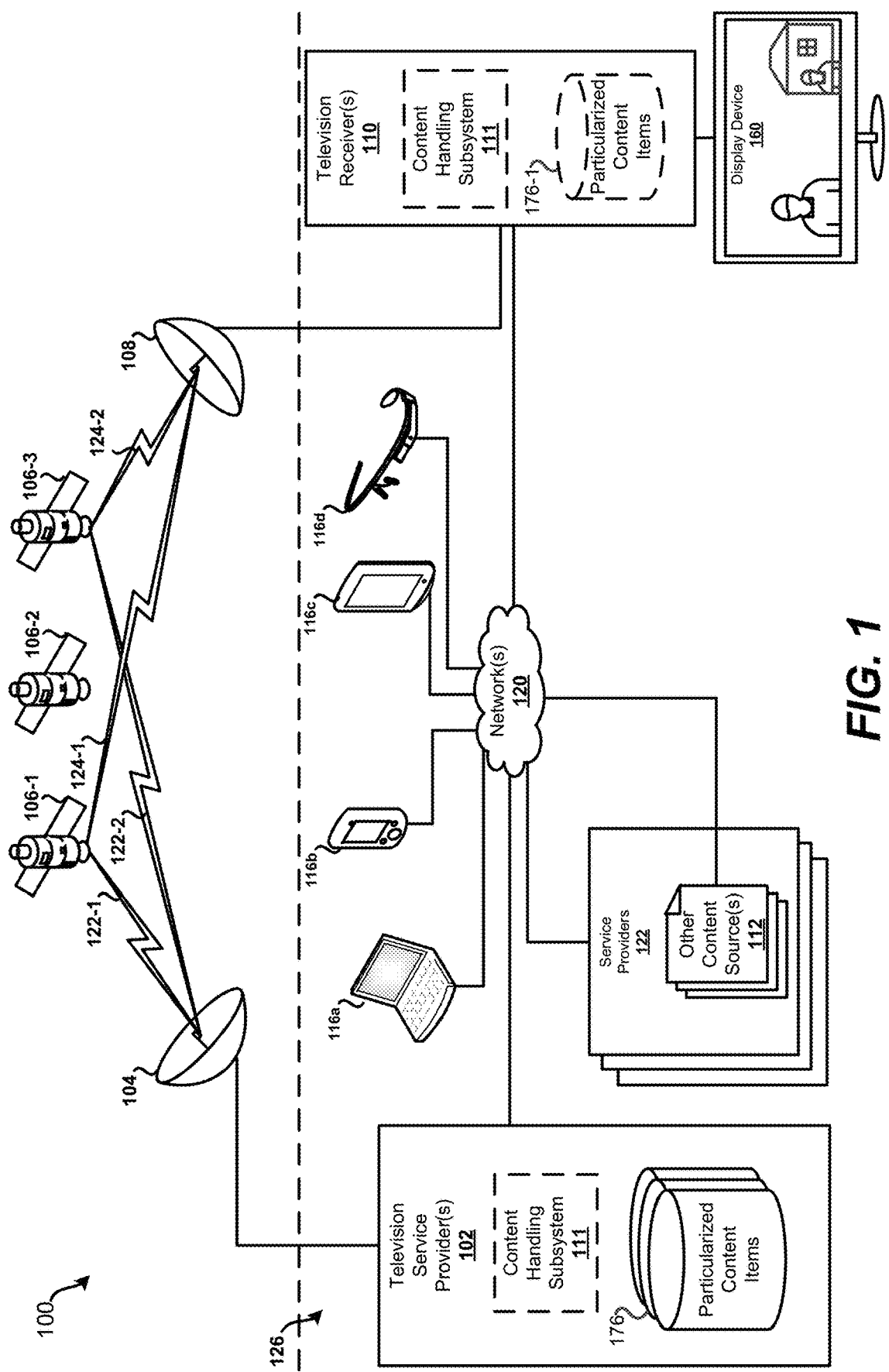
FIG. 1 illustrates a television programming distribution system, in accordance with certain embodiments of the present disclosure.

FIG. 1 illustrates an embodiment of a television program distribution system 100. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include television service provider system 102, satellite uplink 104, a plurality of orbiting (e.g., geosynchronous) satellites 106, satellite receiver 108, television receivers 110, one or more contents sources 112 (e.g., online content sources), one or more catch-up services 114, one or more subscription services 116, one or more (other) television receivers 110-1, computing devices 116a-d, and service providers 122. In some embodiments, the television receiver 110 may include a content splicing subsystem 111. Additionally or alternatively, the television service provider 102 may include a content splicing subsystem 111. Additionally or alternatively, one or more service providers 122 may include a content splicing subsystem 111. The content splicing subsystem 111 may be configured to facilitate various content splicing features in accordance with various embodiments disclosed herein.

The television service provider 102 may include one or more particularized content item repositories 176. The television service provider 102 may store particularized content items in a repository 176. The one or more particularized content item repositories 176 may be implemented in various ways. For example, one or more data processing systems may store particularized content items. One or more relational or object-oriented databases, or flat files on one or more computers or networked storage devices, may store particularized content items. In some embodiments, a centralized system stores particularized content items; alternatively, a distributed/cloud system, network-based system, such as being implemented with a peer-to-peer network, or Internet, may store particularized content items. In some embodiments, the particularized content items may correspond to audiovisual advertisements particularized to certain products and/or services. In some embodiments, the advertisements may correspond to commercials to be presented during commercial breaks of television programming.

The television service provider 102 may provide the particularized content items to the television receiver 110 as part of a data transfer that is sent through the satellite 106. For example, in some embodiments, the television receiver 110 may receive a downlinked satellite signal that includes the data for the particularized content items transferred on a designated line in the vertical blanking interval (VBI) or other portion of the broadcast service transmission that does not interfere with other transmitted content. Additionally or alternatively, the television service provider 102 may provide the particularized content items to the television receiver 110 via the one or more data networks 120. The television receiver 110 may store the particularized content items in a particularized content item repository 176 included in the television receiver 110 or otherwise local to the television receiver 110.

The television service provider system 102 and satellite transmitter equipment (which may include the satellite uplink 104) may be operated by a television service provider. A television service provider may distribute television channels, on-demand programing, programming information, and/or other services to users via satellite. The television service provider system 102 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment may be used to transmit a feed of one or more television channels from the television service provider system 102 to one or more satellites 106. While a single television service provider system 102 and satellite uplink 104 are illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

System 100 may include one or more networks 120 that can be used for a bi-directional communication path for data transfer with television receivers 110 and other components of system 100. The network 120 is intended to represent any number of terrestrial and/or non-terrestrial networks and/or network features. For example, network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

The television receivers 110, as described throughout, may generally be any type of television receiver (such as an STB (set-top box), for example) configured to decode signals received for output and presentation via a display device 160. In another example, television receiver 110 (which may include another remote television receiver, such as a television receiver 110-1) may be integrated as part of or into a television, a DVR, a computing device, such as a tablet computing device, or any other computing system or device, as well as variations thereof. In some embodiments, a television receiver 110 may be a component that is added into the display device 160, such as in the form of an expansion card. A television receiver 110 and network 120 together with television receivers 110 and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 110, display devices 160, computing devices 116, etc. are illustrated in FIG. 1, it should be understood that multiple (e.g., tens, thousands, millions) instances of such equipment, corresponding to various users in various geolocations, may be included the system 100.

In some embodiments, broadcast television programs may be delivered to television receivers, including a television receiver 110, via satellite according to a schedule. On-demand content may also be delivered to a television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by television service provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the television service provider 102 via the satellites 106. For example, the satellite receiver 108 may be configured to receive particular transponder streams as downlink signals 124, from one or more of the satellites 106. Based at least in part on the characteristics of a given television receiver 110 and/or satellite receiver 108, it may only be possible to capture transponder streams from a limited number of transponders of the satellites 106 concurrently. For example, a tuner of the television receiver 110 may only be able to tune to a single transponder stream from a transponder of a single satellite, such as the satellite 106-1, at a time.

The television receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at the television receiver 110. For example, an HD channel may be output to a television by the television receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The television receiver 110 may select via tuner, decode, and relay particular transponder streams to one or more of television receivers 110, which may in turn relay particular transponder streams to one or more display devices 160, 160-1. For example, the satellite receiver 108 and the television receiver 110 may, respectively, be configured to receive, decode, and relay at least one television channel to a television by way of a television receiver 110. Similar to the above-example, a television channel may generally be presented "live," or from a recording as previously stored by the television receiver 110, and may be output to the display device 160, 160-1 by way of the television receiver 110 in accordance with a particular content protection technology and/or networking standard. Other embodiments are possible.

In various embodiments, the content resources 126 may be used to provide the television receiver 110 with content (e.g., television programming). The content resources 126 may be used to retrieve television programs or portions of television programs following and/or during a live broadcast of the television programs. The content resources 126 may include the television service provider 102, the service providers 122, the online content sources 112, one or more other television receivers, and/or the like.

The television service provider 102, which may distribute broadcast television programming to the television receivers 110 via a satellite-based television programming distribution arrangement (or some other form of television programming distribution arrangement, such as a cable-based network or IP-based network, may use an alternate communication path, such as via the network 120, to provide television programming to the television receivers 110. The television receivers 110 may be permitted to request various television programs or portions of television programs from the television service provider 102 via the network 120. For instance, the television service provider 102 may be permitted to transmit a portion of a television program or an entire television program during and/or after a time at which the television program was broadcast live by the television service provider via a satellite-based television programming distribution arrangement.

In some embodiments, the television service provider 102 may provide a television program via on-demand content. On-demand content may be included in a user's subscription or may be provided on a per-request basis. Such on-demand content may be provided via the satellite-based distribution arrangement and/or via the network 120. If the on-demand version of the television program requires payment of a fee, before providing the television program to the television receiver 110, a user of the television receiver 110 may at least need to agree to payment of the fee. On-demand content provided via the satellite-based distribution arrangement may be stored locally by the television receiver 110 to allow on-demand access. On-demand content may also be retrieved via the network 120 from the television service provider 102.

The computing devices 116*a-d* represent various computerized devices that may be associated with a user of the television receiver 110 and that may be configured to facilitate various content discovery features disclosed in various embodiments herein. As indicated by 116*a*, the computing devices 116*a-d* may include a laptop computer, a desktop computer, a home server, or another similar form of computerized device. As indicated by 116*b* and 116*c*, the computing devices 116*a-d* may include a cellular phone and/or smartphone, a tablet computer, or another similar form of mobile device. As indicated by 116*d*, the computing devices 116*a-d* may include smart glasses or another similar form of wearable computing device.

The television receiver 110 may be provided with access credentials that allow access to content stored and/or accessible through one or more of the computing devices 116*a-d*. It should be understood that computing devices 116*a-d* are exemplary in nature. Content may be accessible through a fewer or greater number of computerized devices associated with a user of the television receiver 110.

In some embodiments, the online content sources 112 may represent content resources through which television programs may be retrieved by the television receiver 110 via the network 120. Television programming available through the online content sources 112 may be available for free and not require subscription (a username and/or password may or may not be necessary). Each of the online content sources 112 may represent different websites available via the Internet. For example, some television programming may be legally made available for free (such as television programming provided by government-funded sources, e.g., the BBC or Hulu®). Periodically, the television receiver 110 may poll online content sources 112 to determine which television programs are available and/or which television programs are scheduled to be available in the future. In some embodiments, the television receiver 110 may poll online content sources 112 regarding the availability of at least a portion of a specific television program.

FIG. 1 illustrates an example of a satellite-based television channel distribution system. Again, it should be understood that at least some of the aspects of such a system may be similar to a cable television distribution system, an IPTV content distribution system, and/or any other type of media or content distribution system. For example, in a cable television system, rather than using satellite transponders, multiple RF channels on a cable may be used to transmit streams of television channels. As such, aspects detailed herein may be applicable to cable television distribution systems.

Thus, while network configuration data may be broadcast repeatedly via satellite to television receivers, it should be understood that a similar arrangement may be used in cable-based television programming broadcast networks to broadcast network configuration. For either type of network, various other forms of data may be transmitted via an Internet-based network 120 connection rather than using the television service provider's proprietary network. For instance, EPG data may be transmitted to television receivers via the network 120 (e.g., Internet) connection. As another example, firmware and/or software updates may be transmitted on demand to a television receiver via the Internet rather than the television receiver receiving the update via the television programming broadcast network.

Figure 2:
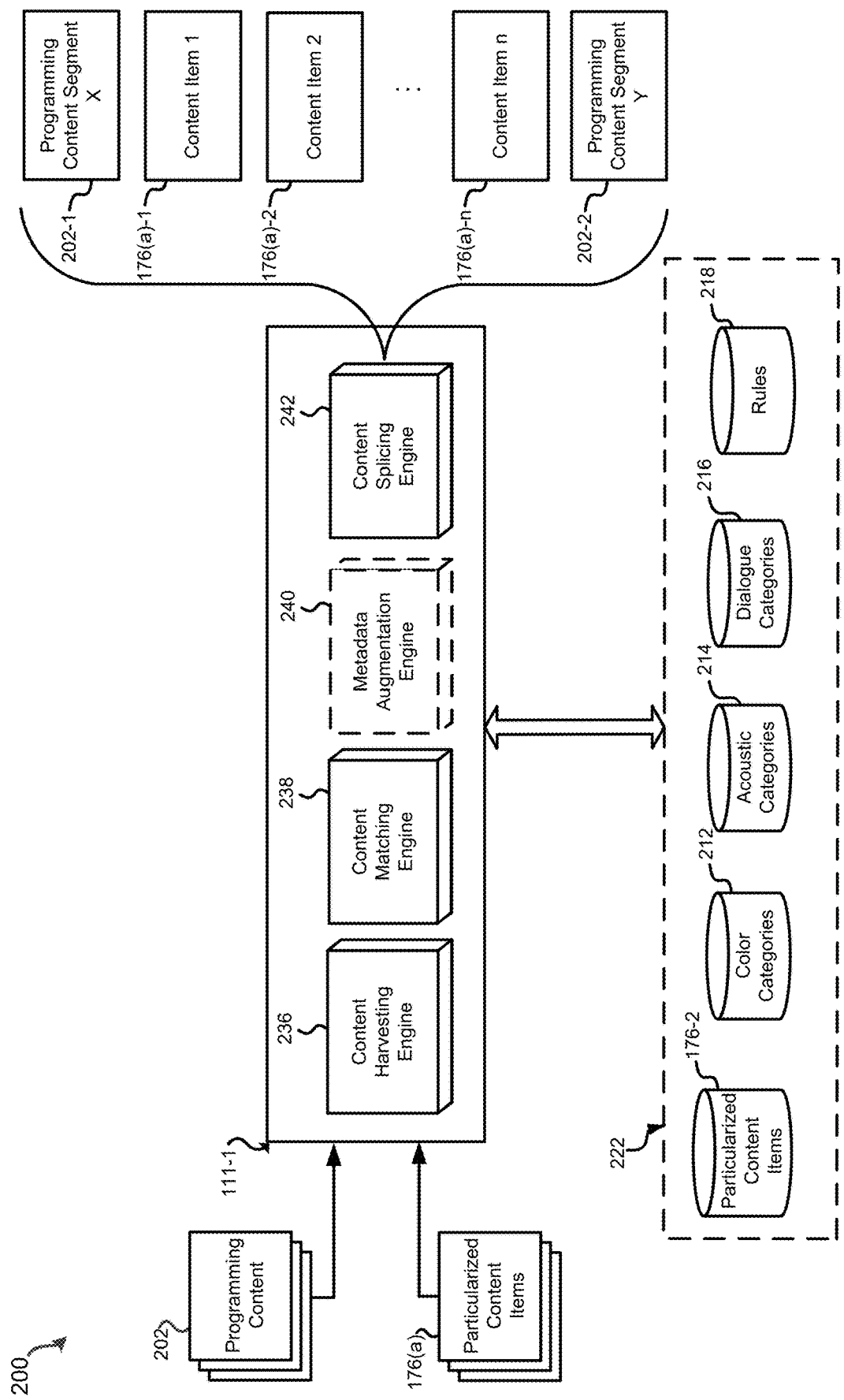
FIG. 2 illustrates a functional diagram of a content splicing system, in accordance with certain embodiments of the present disclosure.

FIG. 2 illustrates a functional diagram of a content splicing system 200, in accordance with certain embodiments of the present disclosure. In certain embodiments, the content splicing system 200 may be included in the television service provider system 102 and/or one or more other service providers 122. In certain embodiments, the content splicing system 200 may be separate from, and provide content to, the television service provider system 102. In certain embodiments, the content splicing system 200 may be included in the end-user system and may be included in the television receiver 110. In certain embodiments, various features of the content splicing system 200 may be distributed between the television receiver 110 and upstream of the television receiver 110.

As depicted, the content splicing system 200 includes a content splicing subsystem 111. The content splicing subsystem 111 may include or otherwise correspond to an audiovisual control engine. The content splicing subsystem 111 may be communicatively coupled with interface components and communication channels (e.g., of the television receiver 110, which may take various forms in various embodiments as disclosed herein) configured to receive programming content 202, which may correspond to movies, television programs, portions thereof, etc. In various embodiments, the programming content 202 may include audiovisual content broadcast and/or otherwise transmitted by the television service provider 102 and/or one or more other service providers 122, and/or one or more recordings of such content for later play-back. The programming content 202 may include various components, including without limitation, one or more video tracks, audio tracks, metadata tracks, close captioning information, and/or the like. In some embodiments, the content splicing system 200 may retain received programming content 202 in one or more content repositories (not shown). The content repositories may include any suitable form of storage media, such as any suitable form disclosed herein.

The content splicing subsystem 111 may be further configured to receive particularized content items 176(a). In some embodiments, the content splicing subsystem 111 may include a harvesting engine 236 configured to aggregate particularized content items 176(a) and/or programming content 202 in order to facilitate content splicing features disclosed herein. In some embodiments, the harvesting engine 236 may be configured to receive, pull, process, buffer, organize, rank, and/or store particularized content items 176(a) and/or programming content 202.

As disclosed above, in some embodiments, the particularized content items 176(a) may correspond to audiovisual advertisements particularized to certain products and/or services. In some embodiments, the advertisements may correspond to commercials to be presented during commercial breaks of television programming. In various embodiments, the content items 176(a) may include audiovisual content broadcast and/or otherwise transmitted by the television service provider 102 and/or one or more other service providers 122. In some embodiments, particularized content items 176(a) may be pushed by the television service provider 102 and/or one or more other service providers 122 to the television receiver 111. In addition or in alternative, particularized content items 176(a) may be pulled by the television receiver 111 (e.g., by the harvesting engine 236) from the television service provider 102 and/or one or more other service providers 122.

In some embodiments, sets of particularized content items 176(a) may be transmitted to the television receiver 111 in batches. For example, sets of particularized content items 176(a) may be transmitted to the television receiver 111 on a periodic or otherwise scheduled basis. In some embodiments, sets of particularized content items 176(a) may be transmitted to the television receiver 111 on an as-needed basis when the television receiver 111 is receiving programming content 202, is scheduled to receive programming content 202, and/or is predicted to receive programming content 202 based at least in part on a detected pattern of past viewing of previous programming content 202 at certain times and on certain days. In some embodiments, sets of particularized content items 176(a) may be selected (e.g., by the service provider(s)) for particular time periods and may be transmitted to the television receiver 111 with an assignment (e.g., by way of tag data or other metadata) for the designated time period. Additionally or alternatively, in some embodiments, sets of particularized content items 176(a) may be selected (e.g., by the service provider(s)) for particular channels and/or television programs and may be transmitted to the television receiver 111 with an assignment (e.g., by way of tag data or other metadata) for the designated channel(s) and/or television program(s).

Additionally or alternatively, in some embodiments, sets of particularized content items 176(a) may be selected (e.g., by the service provider(s)) as tailored for particular viewing habits and inferred interests of viewers. As disclosed in more detail herein, the television receiver 110 (which may include a content matching engine 238 in some embodiments) may determine color, acoustic, and/or dialogue characteristics and/or categories for content that the viewer actually views. The television receiver 110 may push information indicating such characteristics and/or categories to one or more service providers 102 and/or 122. The service providers 102, 122 may select sets of particularized content items 176(a) matching the characteristics and/or categories for transmission to the television receiver 110. The television receiver 110 may select from the sets of particularized content items 176(a) as matching particular segments of programming content 102 and, utilizing a content splicing engine 242 in some embodiments, may output the selected items 176(a) for display after the particular segments.

As disclosed above, the content splicing subsystem 111 may include a matching engine 238 that may include logic to implement and/or otherwise facilitate any taxonomy, classification, categorization, correlation, mapping, qualification, scoring, organization, and/or the like features disclosed herein. In various embodiments, the matching engine 238 may be configured to analyze, classify, categorize, characterize, tag, and/or annotate particularized content items 176(a) and/or programming content 202. The matching engine 238 may take the identified characteristics of a given segment of programming content 202 as cues to select one or more corresponding particularized content items 176(a) for the content splicing engine 242 to output for presentation after the segment of programming content 202 (e.g., at a commercial break) to match or otherwise echo the identified characteristics of the programming content 202.

According to some embodiments, the matching engine 238 may employ one or more artificial intelligence algorithms to perform pattern matching between the identified characteristics of the programming content 202 and the particularized content items 176(a). For example, as disclosed in further detail herein, the matching engine 238 may perform a pattern match between the lighting, dialogue, and music of the programming content 202 and the particularized content items 176(a). When a close match is found, or where there are stronger pattern-matches across more categories, the particularized content items 176(a) with the strongest match may be dynamically placed by the content splicing engine 242 immediately after the scene, followed by the next particularized content items 176(a) that most closely resembled the previous particularized content items 176(a), and so on.

As one example use case out of many possibilities, say a viewer starts watching a programming content 202, and arrives at a scene just before a commercial break, where the scene ends with a particular dialogue, particular lighting, and a particular background music score. When the moment of the transition to the break arrives, the content splicing subsystem 111 dynamically inserts a content item 176(a) which has one or a combination of a word or expression that was in the last dialogue of the previous scene, similar lighting to the previous scene, and/or a similar background score to the previous scene. For example, say the viewer is watching programming content 202 where the scene just before a commercial break, ends with a dialogue from one of the characters which goes "Hello Jim, What a pleasant Surprise!" The content item 176(a) output for display immediately following this scene could be a credit card commercial, where there is a surprise birthday party for the person in the commercial and his friends scream "Surprise!" Since there is an intersection between the scene and the commercial with the word "Surprise," the transition is much more seamless.

Likewise, if there are three content items 176(a) and the programming content 202, after all the content items 176(a), is going to begin with a dialogue where one of the characters says, "That was satisfying," the content item 176(a) just before that could be for a candy bar where the tagline is, "You're just not the same when you're hungry." The transition from "hungry" to "satisfied" makes the experience far more seamless, thus avoiding a context-switching-break for the viewer. As another example, a similar transition could be done with light, where if the lighting of a scene is dim and yellow, the content item 176(a) to be dynamically inserted to follow the scene could be one that also has similarly dim lighting. Further, say a scene X of programming content 202 before a break and a scene Y of programming content 202 after the break have completely different lighting arrangements, where the scene X has dim lighting and the scene Y has bright lighting. The content items 176(a) output for display between the scenes X and Y could be selected to have successively brighter lights so that the transition is more gradual than abrupt. Similarly, with background score, if a scene X ended with high-suspense music, the next content item 176(a) inserted to immediately follow the scene X can be one that has a similar tone, tempo, and pitch. Such transitioning may be employed from one content item 176(a) to the next, where the seamless transition from one content item 176(a) to the next, based on dialogue, lighting, and/or background score is also optimized.

Accordingly, some embodiments of the content splicing subsystem 111 (e.g., by way of the matching engine 238) may be configured to detect one or more color characteristics in particularized content items 176(a) and/or programming content 202. In various embodiments, the one or more color characteristic may include any one or combination of brightness, contrast, color temperature, tint, shade, colorfulness, chroma, intensity, saturation, and/or any suitable color characteristic for a video sequence that may be measured. In some embodiments, the matching engine 238 may include an image analyzer and handling module to facilitate that detection.

By way of example, the matching engine 238 may detect one or more color characteristics in particularized content items 176(a) and/or programming content 202 by way of any one or combination of pixel identification, detecting color component values, detecting color codes, and/or the like. Various embodiments may take various sizes of samples of the particularized content items 176(a) and/or programming content 202. Thus, some embodiments may only analyze one or more portions of a given particularized content item 176(a) and/or programming content 202. For example, some embodiments may only analyze a first portion of a given particularized content item 176(a) (e.g., the first X number of seconds of the content item according to presentation time), whereas some embodiments may analyze the entire particularized content item 176(a). Likewise, some embodiments may only analyze an end portion of a segment of programming content 202 (e.g., the last X number of seconds of the segment according to presentation time prior to transition to a commercial break), whereas some embodiments may analyze the entire segment of programming content 202. Additionally or alternatively, some embodiments may only analyze a beginning portion of a segment of programming content 202 (e.g., the first X number of seconds of the segment according to presentation time just after a commercial break).

Additionally or alternatively to temporal limitations on sample sizes, certain embodiments may employ frame type limitations on sample size. As an example, while some embodiments may analyze all frames of a particularized content items 176(a) and/or a segment of programming content 202, other embodiments may only analyze base frames (e.g., I-frames) and not delta frames (e.g., P-frames and B-frames). Conversely, some embodiments may only analyze delta frames (e.g., P-frames and/or B-frames) and not base frames (e.g., I-frames). Some embodiments may dynamically determine whether to analyze base frames or delta frames based at least in part on applying threshold to the amount of pixel changes corresponding to the delta frames. Hence, some embodiments may analyze delta frames only if the pixel changes of the delta frames are extensive enough to satisfy the threshold (which may correspond to a pixel count and/or relative percentage with respect to entire frame). By way of example, some embodiments may analyze delta frames only if the pixel changes of the delta frames correspond to at least 33 percent of the frame.

Some embodiments may vary the extent of sampling for a particularized content item 176(a) and/or a segment of programming content 202. For example, some embodiments may employ greater sampling upfront and lesser sampling near the end of presentation of the particularized content items 176(a). For example, certain embodiments may sample all frames for the first X seconds of the particularized content items 176(a), then downshift to sampling only I-frames for the balance of the particularized content items 176(a). Similarly, some embodiments may sample all I-frames for the first X seconds of the particularized content items 176(a), then downshift to sampling only a subset of I-frames for the balance of the particularized content items 176(*a*). Still other embodiments may employ greater sampling of an initial portion and an end portion of the particularized content items 176(*a*), while employing lesser or no sampling in the middle of the presentation of the particularized content items 176(*a*). Hence, some embodiments may focus sampling near transitions to and/or from particularized content items 176(*a*) to other content items (whether it is another particularized content items 176(*a*) or the programming content 202).

Similarly, with respect to a segment of programming content 202, some embodiments may employ greater sampling closer to transition points (i.e., an end portion before a commercial break and/or an initial portion after a commercial break) and lesser sampling for portions further the transition points. For example, certain embodiments may sample only I-frames for X seconds of the segment of programming content 202 before a transition point, then upshift to sampling all frames for the last Y seconds before the transition point. Likewise, certain embodiments may sample all frames for the first X seconds of the segment of programming content 202 after a transition point, and then downshift to sampling only I-frames for another Y seconds after that. Certain embodiments may employ greater sampling of an initial portion and an end portion of the segment of programming content 202, while employing lesser or no sampling in the middle of the presentation of the segment of programming content 202.

Some embodiments may sample only portions of images, such as only part of a frame (which could, for example, be specified by identification of pixel coordinates and ranges thereof to define areas of interest). Some embodiments may sample only a central portion of a frame. Other embodiments may only sample a non-central portion, such as a border portion of a frame. Some embodiments may start with one portion of a frame and only sample to an extent to satisfy a threshold. For example, the threshold could be certain percentage of the frame. Various embodiments may apply different or the same sampling techniques to particularized content items 176(*a*) and programming content 202.

The matching engine 238 may, in some embodiments, sum individual colors detected for a sample(s) of a given particularized content item 176(*a*) and/or programming content 202. The summing of the individual colors may include summing counts (e.g., pixel counts) of instances of color component values, color codes, and/or the like. In some embodiments, similar color component values, color codes, etc., may be grouped, for example, into color bands that encompass a range of similar colors with relatively slight variations. Hence, multiple similar colors, and counts thereof, may be correlated to a category 212 for the similar colors, to result in multiple color categories 212. In such embodiments, the summing may include summing counts of instances of color component values, color codes, and/or the like in certain such groupings.

Based at least in part on the summing, the matching engine 238 may create a color profile for a given particularized content item 176(*a*) and/or segment of programming content 202. The color profile could be retained in any suitable form, such as a file, a list, etc. The content splicing subsystem 111 may store color profiles mapped to particularized content items 176(*a*) in the particularized content item repository 176. Similarly, in some embodiments, the content splicing subsystem 111 may store color profiles mapped to segments of programming content 202 in a processed content repository (which could correspond to the particularized content item repository 176 or a separate repository not shown). Each color profile may specify one or more dominant colors and/or color categories 212 (i.e., groupings) as characteristics of the particularized content item 176(*a*) and/or segment of programming content 202. In some embodiments, determination of the dominant colors and/or color categories 212 may be based at least in part on relative percentages with respect to all detected colors or color categories 212. In some embodiments, determination of the dominant colors and/or color categories 212 may be based at least in part on ranking the counts of colors and/or color categories 212. Selection of the dominant colors and/or color categories 212 may include selecting one or more top-ranked colors or color categories 212. Selection of one or more top-ranked colors and/or color categories 212 may be based at least in part on applying one or more thresholds to the summed color values and/or color categories 212.

In some embodiments, a summed color and/or color category 212 having a majority, simple majority, relative majority, plurality, or otherwise of the counts for a given sample may be selected at the top-ranked color and/or color category. In various instances (e.g., when no color or color category 212 satisfies one of those predetermined thresholds of the counts for a given sample), multiple colors and/or color categories 212 may be selected as the top-ranked colors and/or color categories 212, with more colors and/or color categories 212 being selected the closer the counts are to one another.

Additionally or alternatively, the content splicing subsystem 111 (e.g., by way of the matching engine 238) may be configured to detect one or more audio characteristics in particularized content items 176(*a*) and/or programming content 202. The detection of audio characteristics may allow for characterization and matching of the particularized content items 176(*a*) and/or programming content 202 based at least in part on musical score and/or dialogue of the particularized content items 176(*a*) and/or programming content 202. In some embodiments, the matching engine 238 may include an audio analyzer and handling module to facilitate that detection. By way of example, the matching engine 238 may detect one or more audio characteristics in particularized content items 176(*a*) and/or programming content 202 by way of any one or combination of analyzing closed captioning information, analyzing audio, applying voice recognition, acoustic spectrum analysis, and/or the like.

In some embodiments, to detect the one or more audio characteristics, the matching engine 238 may analyze the sample that the matching engine 238 analyzes for color characteristics. In some embodiments, the matching engine 238 may analyze a different size of sample than that which it analyzes for color characteristics. For example, in some embodiments, the matching engine 238 may audio analyze a sample of X seconds before or after a transition point, whereas the matching engine 238 may color analyze a smaller sample of Y seconds before or after the transition point. Thus, the audio sample could be longer and overlap the color sample in some embodiments, and vice versa in other embodiments. Further, color analysis may be employed when audio analysis is not employed in some embodiments and vice versa in some embodiments. For example, one or both of color matching and audio matching may be applied for a transition to a commercial break, whereas a different one or combination of color matching and audio matching may be applied for a transition at the end of the commercial break.

The matching engine 238 may, in some embodiments, analyze the audio track to identify characteristics of a musical score of the sample. For example, the acoustic analysis may include analyzing and identifying the sample for acoustic characteristics such as frequencies, intensities, tones, pitches, and/or the like metrics over time. The matching engine 238 may select values of one or a combination of such acoustic metrics as distinctive markings and may compile the values as an acoustic impression for the purposes of characterizing the musical score of the sample. The acoustic impression may include a spectrum of frequencies in some embodiments. In some cases, the matching engine 238 may correlate the acoustic impression to one or more acoustic categories 214 for the similar acoustic impressions. In various embodiments, the correlation may be based at least in part on matching selected values of the acoustic metrics (e.g., distinctive values such as peaks, baselines, averages, etc.) to acoustic metric ranges of values specified for certain acoustic categories 214. In some embodiments, the correlation may be based at least in part on matching selected values of the acoustic metrics to acoustic fingerprints of particular songs which are categorized as being in certain acoustic categories 214. Thus, some embodiments may identify particular songs and then an associated category 214 such as genre, mood, popularity ranking, recency of release, and/or the like. Additionally or alternatively, some embodiments may not identify particular songs (e.g., as a default or in particular cases where a musical score is not identifiable, such as an ad hoc musical score only for particular content), but may match selected values of the acoustic metrics to certain acoustic categories 214 of like acoustic metrics.

Based at least in part on the acoustic impression, the matching engine 238 may create an acoustic profile for a given particularized content item 176(a) and/or segment of programming content 202. The acoustic profile may be retained in any suitable form, such as a file, a list, etc. The content splicing subsystem 111 may store acoustic profiles mapped to particularized content items 176(a) in the particularized content item repository 176. Similarly, in some embodiments, the content splicing subsystem 111 may store acoustic profiles mapped to segments of programming content 202 in the processed content repository. Each acoustic profile may specify one or more selected values of acoustic metrics as distinctive markings and/or acoustic categories 214 as characteristics of the particularized content item 176(a) and/or segment of programming content 202.

In various embodiments, the matching engine 238 may analyze the audio tracks metadata track, and/or close captioning information to identify dialogue as distinctive markings of the sample. The matching engine 238 may identify one or more keywords and/or expressions in the dialogue as a dialogue impression for the purposes of characterizing the sample. The matching engine 238 may compile the keywords and/or expressions of the sample and retain the keywords and/or expressions in the dialogue impression. In some cases, the matching engine 238 may correlate the dialogue impression to one or more dialogue categories 216 for similar dialogue impressions. In various embodiments, the correlation may be based at least in part on matching selected keywords and/or expressions to identical and/or similar keywords and/or expressions specified for certain dialogue categories 216. The dialogue categories 216 may include categorizations of concept, keyword, expression, mood, theme, emotion, and/or the like.

Based at least in part on the dialogue impression, the matching engine 238 may create a dialogue profile for a given particularized content item 176(a) and/or segment of programming content 202. The dialogue profile may be retained in any suitable form, such as a file, a list, etc. The content splicing subsystem 111 may store dialogue profiles mapped to particularized content items 176(a) in the particularized content item repository 176. Similarly, in some embodiments, the content splicing subsystem 111 may store dialogue profiles mapped to segments of programming content 202 in the processed content repository. Each dialogue profile may specify one or more selected keywords and/or expressions as distinctive markings and/or dialogue categories 216 as characteristics of the particularized content item 176(a) and/or segment of programming content 202.

In some embodiments, the content splicing subsystem 111 may be configured to insert metadata into the data stream of programming content 202 and/or into particularized content items 176(a). Some embodiments may include a metadata augmentation engine 240 to facilitate such features. The metadata augmentation engine 240, as with certain embodiments of the other engines, may include instructions retained in a computer-readable media and to be executed by one or more processors. With some such embodiments, the metadata augmentation engine 240 may be upstream of a television receiver, for example, at a service provider 102 or 112. Likewise, one or more of the other portions of the content splicing subsystem 111 may be upstream at a service provider. In other embodiments, the one or more portions, or all, of the content splicing subsystem 111 may be included in a television receiver 110.

Figure 3:
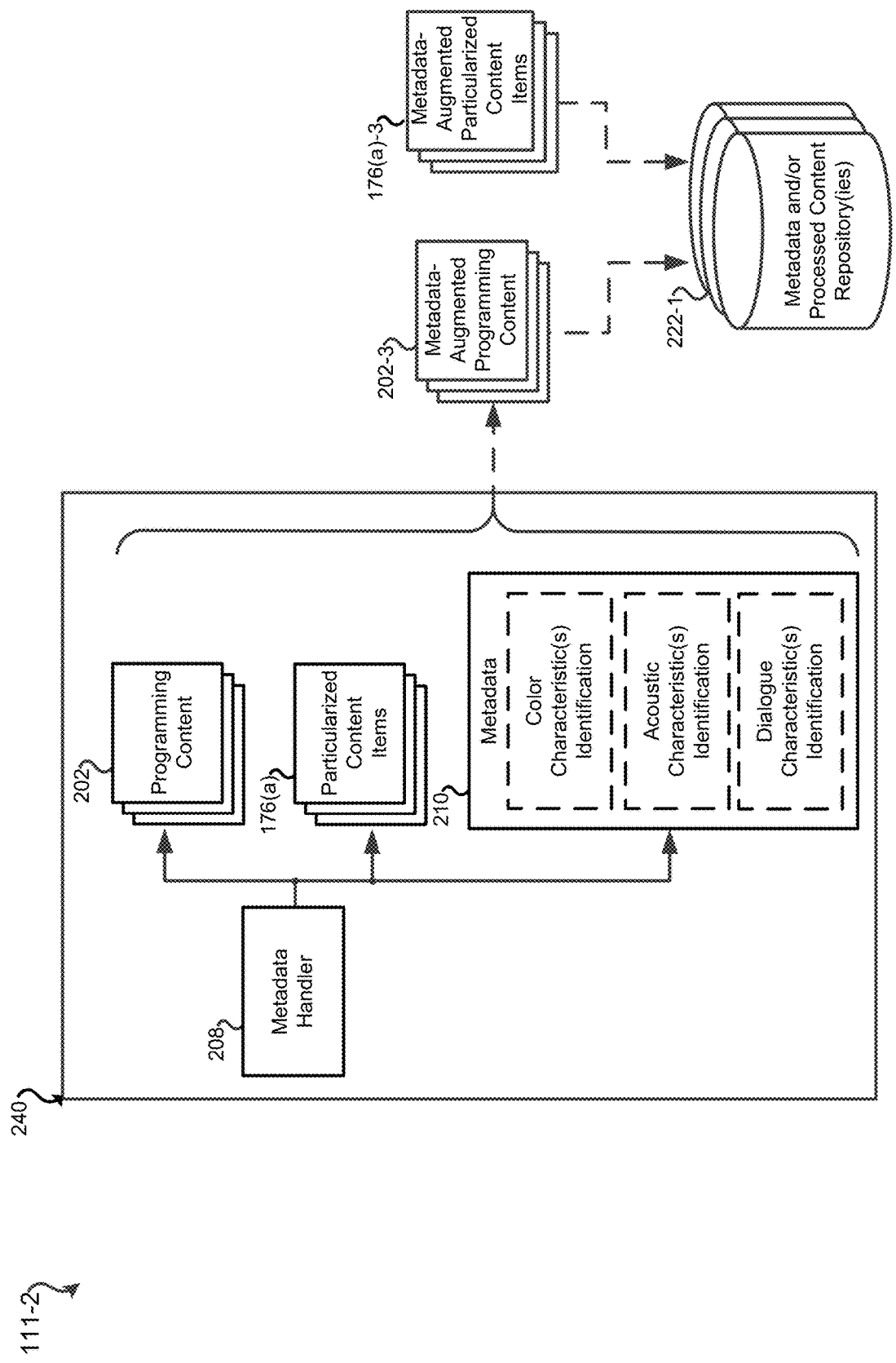
FIG. 3 is a simplified illustration of a portion of the content splicing subsystem with metadata augmentation features, in accordance with certain embodiments of the present disclosure.

FIG. 3 is a simplified illustration of a portion of the content splicing subsystem 111-2 with metadata augmentation features, in accordance with certain embodiments of the present disclosure. While not all components of subsystem 111-1 are shown in FIG. 3, the content splicing subsystem 111-2 may include one or a combination of such components. As disclosed above, the content matching engine 238 may identify one or more characteristics and/or categories of the particularized content items 176(a) and/or programming content 202. Based at least in part on such identification, the metadata augmentation engine 240 may create metadata 208, which, in some embodiments, may correspond to tag data. Hence, the metadata augmentation engine 240 may process particularized content items 176(a) and/or programming content 202 and provide tagged particularized content items 176(a)-1 and/or tagged programming content 202-1.

The metadata augmentation engine 240 may include a metadata handler 208 that may generate metadata 210 (e.g., one or more tags 210) corresponding to the characteristics and/or categories. In some embodiments, the metadata 210 may be inserted into the output particularized content items 176(a) and/or output programming content 202. In some embodiments, the one or more tags 210 may not be inserted into the particularized content items 176(a) and/or programming content 202 but may be sent with the output particularized content items 176 and/or output programming content 202. For example, metadata augmentation engine 240 may assign packet identifiers to identify data of the content that is to be transmitted as part of a data stream to a television receiver and that is to be associated with one or more tags. In any case, the content splicing subsystem 111-2 may output metadata-augmented particularized content items 176(a)-1 and/or metadata-augmented programming content 202-1. In some embodiments, the metadata-augmented particularized content items 176(a)-1 and/or metadata-augmented programming content 202-1 may be stored at least temporarily in one or more repositories 222. In some embodiments, tag data may be stored at least temporarily in one or more repositories 222.

Data transmitted as part of a data stream to a television receiver may be packetized and assigned packet identifiers. A particular packet identifier may be associated with data packets related to tags for particular segments of metadata-augmented particularized content items 176(a)-1 and/or metadata-augmented programming content 202-1. Tag data may include an indication of a period of time (or other measure of time, e.g., a number of frames), a start frame, an end frame, and/or the like. Tag data may include or otherwise be associated with a tag identifier and may include characteristic and/or category identifiers. For example, tag data may include any one or combination of color characteristic and/or category identifiers, acoustic characteristic and/or category identifiers, dialogue characteristic and/or category identifiers, and/or the like.

Thereafter, the matching engine 238 may be configured to match particularized content items 176(a)-1 to segments of programming content 202-1 based at least in part on metadata at a service provider system or at client-side television receiver 110, in accordance with various embodiments. For example, metadata may be extracted when or before a given segment of programming content 202-1 is to be output for display and before a transition point. The matching engine 238 may read the metadata mapped to the segment and perform a search of the repositories 222-1 for particularized content items 176(a)-1 that also has metadata matching the extracted metadata in one or more categories (dialogue, lighting, music), with the highest preference given to the ad that has metadata most closely matching the metadata of previous scene/segment. Accordingly, certain embodiments may facilitate matching of particularized content items 176(a) to segments of programming content 202 based at least in part on metadata.

Referring again to FIG. 2, in various embodiments utilizing such metadata or not utilizing such metadata, the matching engine 238 may be configured to identify one or more particularized content items 176(a) corresponding to the segments of programming content 202 based at least in part on one or a combination of color characteristics, acoustic characteristics, and/or dialogue characteristics. The matching engine 238 may perform correlation based at least in part on correlation rules 218 in some embodiments. The matching engine 238 may correlate the one or more particularized content items 176(a) to the segments of programming content 202 based at least in part on one or a combination of such characteristics. In some embodiments, the correlation may be based at least in part on the color profiles, acoustic profiles, and/or dialogue profiles of the particularized content items 176(a) and/or segments of programming content 202. In some embodiments, the correlation may be based at least in part on color categories 212, acoustic categories 214, and/or dialogue categories 216 of the particularized content items 176(a) and/or segments of programming content 202.

The correlation rules 218 may include correlation criteria that could include color specifications identified by any one or combination of values and/or identifiers of color characteristics or components, ranges of the values or identifiers, specifications of complimentary range or groupings, and/or like color correlation information. In addition or in alternative, the correlation rules 218 may include correlation criteria that could include keywords identified by any one or combination of words, word stems, phrase, word groupings, and/or like keyword information. In addition or in alternative, the correlation rules 218 may include correlation criteria that could include acoustic specifications identified by any one or combination of values and/or identifiers of acoustic characteristics or components, ranges or groupings of the values or identifiers, specifications of complimentary range or groupings, and/or like acoustic correlation information. The correlation criteria could include weightings assigned to color specifications, dialogue specification, acoustic specifications, and/or the like. Hence, within each color, acoustic, and/or dialogue bucket, a color characteristic, keyword, and/or acoustic characteristic could be assigned a weight according to its significance. By way of example, brightness could be assigned a greater weight than contrast, acoustic genre could be assigned a greater weight than recency of release, and more significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision tree, with contingencies so that only certain combinations of characteristics and/or keywords may be considered. For example, certain characteristics and/or keywords could only have significance if used in conjunction with other keywords, and/or not in conjunction with others.

In some embodiments, the matching engine 238 may employ a scoring system to correlate the particularized content items 176(a) and/or segments of programming content 202. Some embodiments may quantify correlations with a numerical expression, for example, a match score, with higher scores being assigned to higher correlations of particularized content items 176(a) with segments of programming content 202. Higher scores may be assigned for greater extents of matching. For example, a match of three top-ranked colors and/or color categories 212 of the particularized content items 176(a) and programming content 202 may be assigned a higher score than a match of only one top-ranked color and/or color category 212. As another example, an exact match of colors and/or color categories 212 may be assigned a higher score than a complimentary match (e.g., where absent an exact match, one color and/or color category 212 is defined as a complement to another color and/or color category 212). Hence, closeness of matching may be a basis for scoring.

Likewise, such examples may apply to dialogue correlation. For example, a match of three dialogue cues or dialogue categories 216 of the particularized content items 176(a) and programming content 202 may be assigned a higher score than a match of only one top dialogue cue and/or dialogue category 216. As another example, an exact match of words, expressions, and/or dialogue categories 216 may be assigned a higher score than a complimentary match (e.g., where absent an exact match, a word, expression, and/or dialogue category 216 is defined as a complement to another a word, expression, and/or dialogue category 216). Further, in like manner, such examples may apply to acoustic correlation with acoustic characteristics and/or categories 214.

Further, various embodiments may accord different weights to color correlation, acoustic correlation, and/or dialogue correlation. By way of example, some embodiments may accord a greater weight to color correlation than to acoustic correlation, and greater weight to acoustic correlation than to dialogue correlation. A high correlation may be identified using any suitable qualification scheme (e.g., a score threshold, a score ranking, etc.). Some contingencies could be implemented so that only a threshold correlation needs be identified. For example, if a sufficiently close match is found on the basis of one bucket (e.g., color correlation) to meet the threshold, the matching particularized content item 176(a) may be selected. But, if a sufficiently close match is found on that basis, one or more of the buckets may be used as a basis to identify a stronger pattern match. In some embodiments, a set of particularized content items 176(a) may be ranked according to correlation such that the strongest matching content item 176(a) is ranked highest, and the ranked set may be selected for presentation in the ranked order after the matched segment of programming content 202. In other embodiments, only the strongest matching content item 176(a) may be selected for presentation in the ranked order after the segment of programming content 202, and a second content item 176(a) may be selected on as a match to the strongest matching content item 176(a). Thus, subsequent content items 176(a) could be serially matched with previously selected content items 176(a).

In some embodiments, the content splicing engine 242 may include a multiplexer. The multiplexer may create a digital stream of data packets containing the video, audio, and, in some embodiments, the metadata to output the programming content 202 and the selected particularized content items 176(a). In embodiments where the content splicing engine 242 is implemented at the service provider system 102, the multiplexed data stream may be transmitted on a particular transponder stream via a transponder of a satellite. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the television service provider 102. A control word generator may generate the control word that is used by a scrambling engine to scramble the video or audio present in the data packet. Control words generated by the control word generator may be passed to a security system, which may be operated by the television service provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for transmission to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

Figure 4:
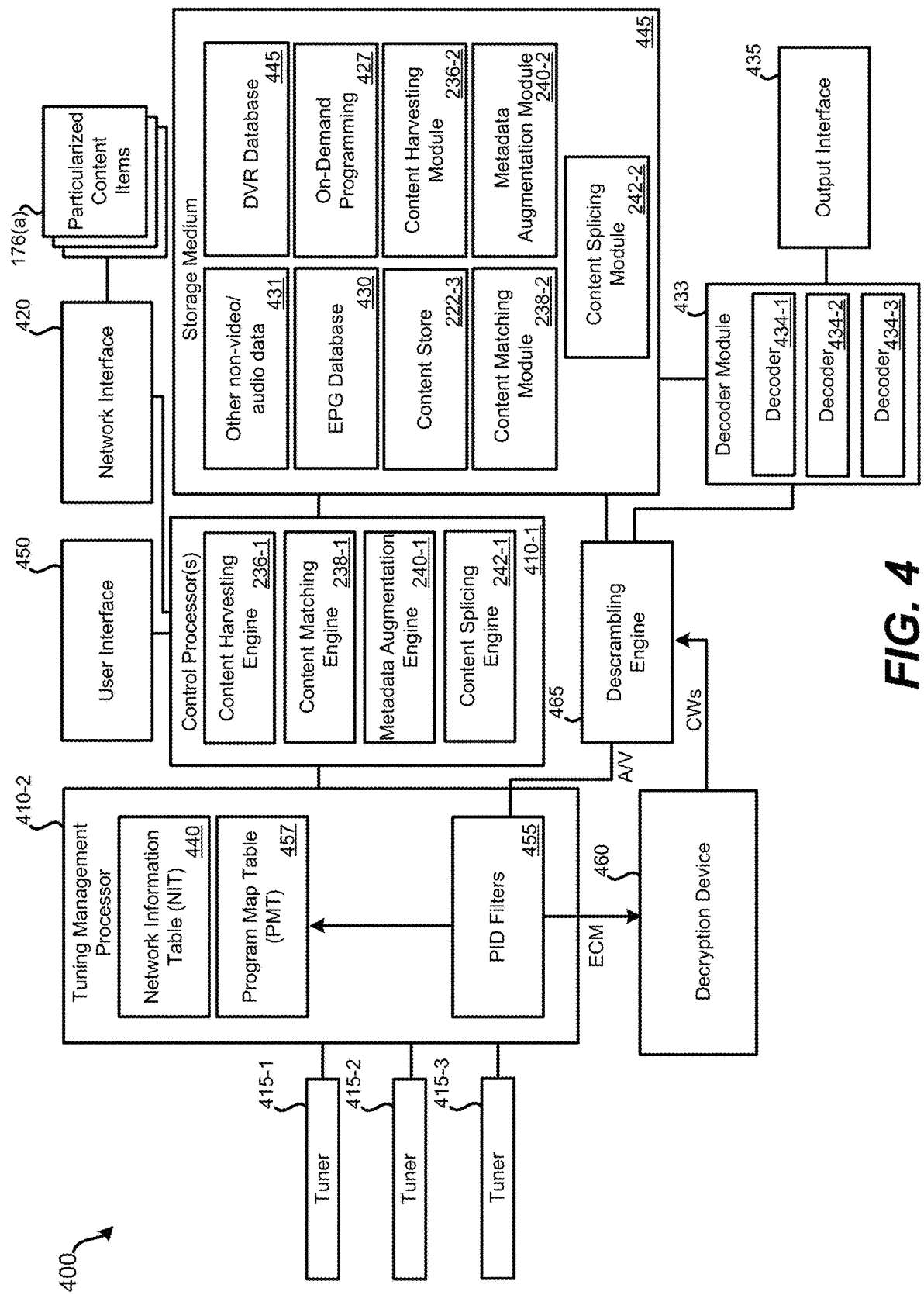
FIG. 4 illustrates a receiver that makes use of, interacts with, and/or at least partially includes the content splicing system, in accordance with certain embodiments of the present disclosure.

FIG. 4 illustrates a receiver 400 that makes use of, interacts with, and/or at least partially includes the content splicing system 200, in accordance with certain embodiments of the present disclosure. Certain embodiments of the receiver 400 may include set top boxes (STBs), television receivers, and over-the-top receivers. In some embodiments, the receiver 400 may correspond to the television receiver 110. In various embodiments, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television). One or a combination of the content harvesting engine 236-1, the content matching engine 238-1, content augmentation engine 240-1, and/or content splicing engine 242-1 may be provided in conjunction with content harvesting module 236-2, the content matching module 238-2, content augmentation module 240-2, and/or content splicing module 242-2 to implement various functionalities of the content splicing subsystem 111 into the receiver 400.

The receiver 400 may represent receiver 110 of FIG. 1 and may be in the form of a STB that communicates with a display device such as a television. The receiver 400 may be incorporated as part of a television, such as the display device 160 of FIG. 1 or television 400 of FIG. 4, etc. The receiver 400 may include: processors 410 (which may include control processor 410-1, tuning management processor 410-2, and possibly additional processors), tuners 415, network interface 420, non-transitory computer-readable storage medium 425, electronic programming guide (EPG) database 430, networking information table (NIT) 440, digital video recorder (DVR) database 445, on-demand programming 427, content store 222-3, user interface 450, decryption device 460, decoder module 433, interface 435, and/or descrambling engine 465. In other embodiments of receiver 400, fewer or greater numbers of components may be present. It should be understood that the various components of receiver 400 may be implemented using hardware, firmware, software, and/or some combination thereof. Functionality of components may be combined; for example, functions of descrambling engine 465 may be performed by tuning management processor 410-2. Further, functionality of components may be spread among additional components; for example, PID filters 455 may be handled by separate hardware from program map table 457. The receiver 400 may be in data communication with service providers, such as by way of network interface 420.

The processors 410 may include those configured to perform processes such as tuning to a particular channel, accessing and displaying EPG information from the EPG database 430, and/or receiving and processing input from a user. For example, the processors 410 may include one or more processors dedicated to decoding video signals from a particular format, such as MPEG, for output and display on a television and for performing decryption, if required. It should be understood that the functions performed by various modules of FIG. 4 may be performed using one or more processors. As such, for example, functions of the descrambling engine 465 may be performed by the control processor 410-1.

The control processor 410-1 may communicate with tuning management processor 410-2. The control processor 410-1 may control the recording of television channels based at least in part on timers stored in the DVR database 445. The control processor 410-1 may also provide commands to the tuning management processor 410-2 when recording of a television channel is to cease. In addition to providing commands relating to the recording of television channels, the control processor 410-1 may provide commands to the tuning management processor 410-2 that indicate television channels to be output to the decoder module 433 for output to a display device. The control processor 410-1 may also communicate with the network interface 420 and the user interface 450. The control processor 410-1 may handle incoming data from network interface 420, including network transport streams received from over-the-top service providers. The control processor 410-1 may handle incoming data from the network interface 420, including network transport streams received from the user interface 450, which may include user input received by way of one or more human interface devices. Additionally, the control processor 410-1 may be configured to output data via the network interface 420. The control processor 410 may also be configured to perform image and audio analysis, such as to identify contextual aspects present in an audio or video stream, for example facial recognition or voice recognition.

The tuners 415 may include one or more tuners used to tune to transponders that include broadcasts of one or more television channels that may be received from a satellite or cable system, for example. In the illustrated embodiment of receiver 400, three tuners are present (tuner 415-1, tuner 415-2, and tuner 415-3). In other embodiments, two or more than three tuners may be present, such as four, six, or eight tuners. Each tuner contained in the tuners 415 may be capable of receiving and processing a single transponder stream from a satellite transponder at a given time, for example. As such, a single tuner may tune to a single transponder stream at a given time. If the tuners 415 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of the tuners 415 may be used to receive the signal containing the multiple television channels for presentation and/or recording. The tuners 415 may receive commands from the tuning management processor 410-2. Such commands may instruct the tuners 415 which frequencies are to be used for tuning.

The network interface 420 may be used to communicate via an alternate communication channel with a television service provider, if such communication channel is available. The primary communication channel may be via satellite (which may be unidirectional to the receiver 400) and the alternate communication channel (which may be bidirectional) may be via a network, such as the Internet. Referring back to FIG. 1, receiver 110 may be able to communicate with television service provider system 102 via a network 120, such as the Internet. This communication may be bidirectional: data may be transmitted from the receiver 110 to the television service provider system 102 and from the television service provider system 102 to the receiver 110. Referring back to FIG. 4, the network interface 420 may be configured to communicate via one or more networks, such as the Internet, to communicate with television service provider system 102 of FIG. 1. Other information may be transmitted and/or received via the network interface 420 such as particularized content items 176(*a*), information indicative of content characteristics and/or categories, and/or the like.

The storage medium 425 may represent one or more non-transitory computer-readable storage mediums. The storage medium 425 may include memory and/or a hard drive. The storage medium 425 may be used to store information received from one or more satellites and/or information received via the network interface 420. The storage medium 425 may store information related to the EPG database 430, augmentation module 432 and related preferences, other non-video/audio data 431, DVR database 445, commercial database 446, and/or on-demand programming 427. Recorded television programs may be stored using the storage medium 425 as part of the DVR database 445. The storage medium 425 may be partitioned or otherwise divided (such as into folders) such that predefined amounts of the storage medium 425 are devoted to storage of television programs recorded due to user-defined timers and stored television programs recorded due to provider-defined timers.

The EPG database 430 may store information related to television channels and the timing of programs appearing on such television channels. The EPG database 430 may be stored using the storage medium 425, which may be a hard drive. Information from the EPG database 430 may be used to inform users of what television channels or programs are popular and/or provide recommendations to the user. Information from the EPG database 430 may provide the user with a visual interface displayed by a television that allows a user to browse and select television channels and/or television programs for viewing and/or recording. Information used to populate the EPG database 430 may be received via the network interface 420 and/or via satellites, such as the satellite 106 of FIG. 1 via the tuners 415. For instance, updates to the EPG database 430 may be received periodically via satellite. The EPG database 430 may serve as an interface for a user to control DVR functions of the receiver 400, and/or to enable viewing and/or recording of multiple television channels simultaneously. Information from EPG database 430 may be output as a video stream to a display device. A particular user may issue commands indicating that an EPG interface be presented. A user issuing a command that an EPG be displayed may constitute a change command. In some embodiments, particularized content items 176(*a*) may be selected, based at least in part on characteristics and/or categories of the last content viewed/presented, and presented in conjunction with the EPG. For example, particularized content items 176(*a*) could pertain to recommendations of programming (e.g., previews) and/or commercial advertisements. Hence, seamless transitioning features may extend to EPG views in some embodiments.

The network information table (NIT) 440 may store information used by the receiver 400 to access various television channels. The NIT 440 may be stored locally by a processor, such as the tuning management processor 410-2 and/or by the storage medium 425. Information used to populate the NIT 440 may be received via satellite (or cable) through the tuners 415, may be received via the network interface 420, such as from the television service provider. As such, information present in the NIT 440 may be periodically updated. In some embodiments, NIT 440 may be locally-stored by the receiver 400 using the storage medium 425. Generally, the NIT 440 may store information about a service provider network, such as a satellite-based service provider network. Information that may be present in the NIT 440 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, the NIT 440 may contain additional data or additional tables may be stored by the receiver. For example, while specific audio PIDs and video PIDs may not be present in the NIT 440, a channel identifier may be present within the NIT 440 which may be used to look up the audio PIDs and video PIDs in another table, such as a program map table (PMT). In some embodiments, a PID associated with the data for the PMT is indicated in a separate table, program association table (PAT), which is not illustrated in FIG. 4. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, the NIT 440 and/or the PMT 457 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based at least in part on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of the storage medium 425 may be devoted to storage of television programming, a portion may be devoted to storage of non-audio/video data, such as the EPG database 430 and other non-video/audio data 431. This "other" data may permit the receiver 400 to function properly. In some embodiments, at least ten gigabytes are allocated to such other data. For example, if the NIT 440 is stored by the storage medium 425, it may be part of the other non-video/audio data 431.

The decoder module 433 may serve to convert encoded video and audio into a format suitable for output to a display device. For instance, the decoder module 433 may receive MPEG video and audio from the storage medium 425, the network interface 420, or the descrambling engine 465 to be output to a television. MPEG video and audio from the storage medium 425 may have been recorded to the DVR database 445 as part of a previously-recorded television program. The decoder module 433 may convert the MPEG video and audio into a format appropriate to be displayed by a television or other form of display device and audio into a format appropriate to be output from speakers, respectively. The decoder module 433 may have the ability to convert a finite number of television channel streams received from the storage medium 425, the network interface 420, or the descrambling engine 465 simultaneously. For instance, each of the decoders 434 within the decoder module 433 may be able to only decode a single television channel at a time.

While a television channel is being decoded by a decoder of the decoders 434, the television channel is not necessarily output to a display device via the television interface 435. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of the decoder module 433 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to the television interface 435, may be controlled by the control processor 410-1, or some other processor. While the decoder module 433 is illustrated as having three decoders 434 (decoder 434-1, decoder 434-2, and decoder 434-3), in other embodiments, a greater or fewer number of decoders may be present in the receiver 400.

The television interface 435 may serve to output a signal to a television (or another form of display device) in a proper format for display of video and playback of audio. As such, the television interface 435 may output one or more television channels, stored television programming from the storage medium 425 (e.g., television programs from the DVR database 445, television programs from on-demand programming 427 and/or information from the EPG database 430) to a television for presentation.

Digital Video Recorder (DVR) functionality may permit a television channel to be recorded for a period of time. DVR functionality of the receiver 400 may be managed by the control processor 410-1. The control processor 410-1 may coordinate the television channel, start time, and stop time of when recording of a television channel is to occur. In various embodiments, particularized content items 176(*a*) could be selected and inserted into the presentation stream prior to recording, during recording, and/or upon playback of the recording. The DVR database 445 may store information related to the recording of television channels. The DVR database 445 may store timers that are used by the control processor 410-1 to determine when a television channel should be tuned to and its programs recorded to the DVR database 445 of storage medium 425. In some embodiments, a limited amount of the storage medium 425 may be devoted to the DVR database 445. Timers may be set by the television service provider and/or one or more users of the receiver 400.

User profiles may also be stored in the storage medium 445 and may include stored user preferences that may be inferred by the television receiver 400 based at least in part on viewing history. The television receiver 400 may communicate user profile information to the service provider 102, 122 to request particularized content items 176(a) tailored to the inferred user preferences made with respect to augmented content in accordance with certain embodiments disclosed herein. The user profiles may include profiles for multiple users or may include a single profile for the television receiver in general. In some embodiments, the user profiles may include preferences for customized content presentation adjustments disclosed herein. The preferences could include customized viewing interests, such as programming content, advertising content, product content, and/or the like that corresponds to augmented content selections relating to recognized actors and/or products. The user profiles may further include user feedback, via user-selectable options, received from the user regarding customizations. The feedback data may be used to refine the customizations for particular viewers and types of content customizations.

The on-demand programming 427 may represent additional television programming stored by the storage medium 425. The on-demand programming 427 may include television programming that was not recorded to the storage medium 425 via a timer (either user- or provider-defined). Rather, on-demand programming is programming provided to the receiver directly for storage by the receiver and for later presentation to one or more users. In various embodiments, particularized content items 176(a) could be selected and inserted into the presentation stream prior to or upon playback of the recording.

The user interface 450 may include a remote control (physically separate from the receiver 400) and/or one or more buttons on the receiver 400 that allow a user to interact with the receiver 400. The user interface 450 may be used to select a television channel for viewing, view information from the EPG database 430, and/or program a timer stored to DVR database 445, wherein the timer is used to control the DVR functionality of the control processor 410-1. The user interface 450 may also be used to transmit commands to the receiver 400 and make user selections to customize user preferences.

Referring back to the tuners 415, television channels received via satellite (or cable) may contain at least some scrambled data. Packets of audio and video may be scrambled to prevent unauthorized users (e.g., nonsubscribers) from receiving television programming without paying the television service provider. When a tuner of the tuners 415 is receiving data from a particular transponder of a satellite, the transponder stream may be a series of data packets corresponding to multiple television channels. Each data packet may contain a packet identifier (PID), which, in combination with the NIT 440 and/or the PMT 457, may be determined to be associated with a particular television channel. Particular data packets, referred to as entitlement control messages (ECMs), may be periodically transmitted. ECMs may be associated with another PID and may be encrypted; the receiver 400 may use the decryption device 460 to decrypt ECMs. Decryption of an ECM may only be possible if the user has authorization to access the particular television channel associated with the ECM. When an ECM is determined to correspond to a television channel being stored and/or displayed, the ECM may be provided to the decryption device 460 for decryption.

The decryption device 460 may be a removable or non-removable smart card. When the decryption device 460 receives an encrypted ECM, the decryption device 460 may decrypt the ECM to obtain some number of control words. In some embodiments, from each ECM received by the decryption device 460, two control words are obtained. In some embodiments, when the decryption device 460 receives an ECM, it compares the ECM to the previously received ECM. If the two ECMs match, the second ECM is not decrypted because the same control words would be obtained. In other embodiments, each ECM received by the decryption device 460 is decrypted; however, if a second ECM matches a first ECM, the outputted control words will match; thus, effectively, the second ECM does not affect the control words output by the decryption device 460. The decryption device 460 may be permanently part of the receiver 400 or may be configured to be inserted and removed from the receiver 400. In some embodiments, the control processor 410-1, the tuning management processor 410-2, or other hardware may be able to determine that a received ECM has not changed from the previous iteration, and therefore not provide the repeated ECM to the smart card, since the same control word(s) will be obtained.

The tuning management processor 410-2 may be in communication with the tuners 415 and the control processor 410-1. The tuning management processor 410-2 may be configured to receive commands from the control processor 410-1. Such commands may indicate when to start/stop recording a television channel and/or when to start/stop causing a television channel to be output to a television. The tuning management processor 410-2 may control the tuners 415. From the tuners 415, the tuning management processor 410-2 may receive transponder streams of packetized data. From the network interface 420, the tuning management processor 410-2 may receive network transport stream of packetized data. As previously detailed, some or all of these packets may include a PID that identifies the content of the packet.

The tuning management processor 410-2 may be configured to create one or more PID filters 455 that sort packets received from the tuners 415 and/or the network interface 420 based at least in part on the PIDs. When a tuner is initially tuned to a particular frequency (e.g., to a particular transponder of a satellite), a PID filter may be created based at least in part on the PMT data. The PID created, based at least in part on the PMT data packets, may be known because it is stored as part of the NIT 440 or another table, such as a program association table (PAT). From the PMT data packets, PMT may be constructed by the tuning management processor 410-2.

The PID filters 455 may be configured to filter data packets based at least in part on PIDs. In some embodiments, the PID filters 455 are created and executed by the tuning management processor 410-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. The PMT 457 may store the particular assignments of PIDs for individual television channels. For example, if a transponder data stream includes multiple television channels, data packets corresponding to a television channel that is not desired to be stored or displayed by the user may be ignored by the PID filters 455 and not routed to the descrambling engine 465, the decryption device 460, or the control processor 410-1. As such, only data packets corresponding to the one or more television channels desired to be stored and/or displayed may be filtered and passed to either the descrambling engine 465 or the decryption device 460; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to the NIT 440, may be appropriately routed by the PID filters 455. At a given time, one or multiple PID filters may be executed by the tuning management processor 410-2.

The descrambling engine 465 may use the control words output by the decryption device 460 in order to descramble video and/or audio corresponding to television channels for storage and/or presentation. Video and/or audio data contained in the transponder data stream received by the tuners 415 may be scrambled. Video and/or audio data may be descrambled by the descrambling engine 465 using a particular control word. Which control word output by the decryption device 460 to be used for successful descrambling may be indicated by a scramble control identifier present within the data packet containing the scrambled video or audio. Descrambled video and/or audio may be output by the descrambling engine 465 to the storage medium 425 for storage (in the DVR database 445) and/or to the decoder module 433 for output to a television or other presentation equipment via the television interface 435.

For simplicity, the receiver 400 of FIG. 4 has been reduced to a block diagram; commonly known parts, such as a power supply, have been omitted. Further, some routing between the various modules of the receiver 400 has been illustrated. Such illustrations are for exemplary purposes only. The state of two modules not being directly or indirectly connected does not indicate the modules cannot communicate. Rather, connections between modules of the receiver 400 are intended only to indicate possible common data routing. It should be understood that the modules of the receiver 400 may be combined into a fewer number of modules or divided into a greater number of modules.

Further, the components of the television receiver 400 may be part of another device, such as built into a television. The television receiver 400 may include one or more instances of various computerized components, such as disclosed in relation to computer systems disclosed further herein. While the television receiver 400 has been illustrated as a satellite receiver, it is to be appreciated that techniques below may be implemented in other types of television receiving devices, such as cable receivers, terrestrial receivers, IPTV receivers or the like. In some embodiments, the television receiver 400 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 5:
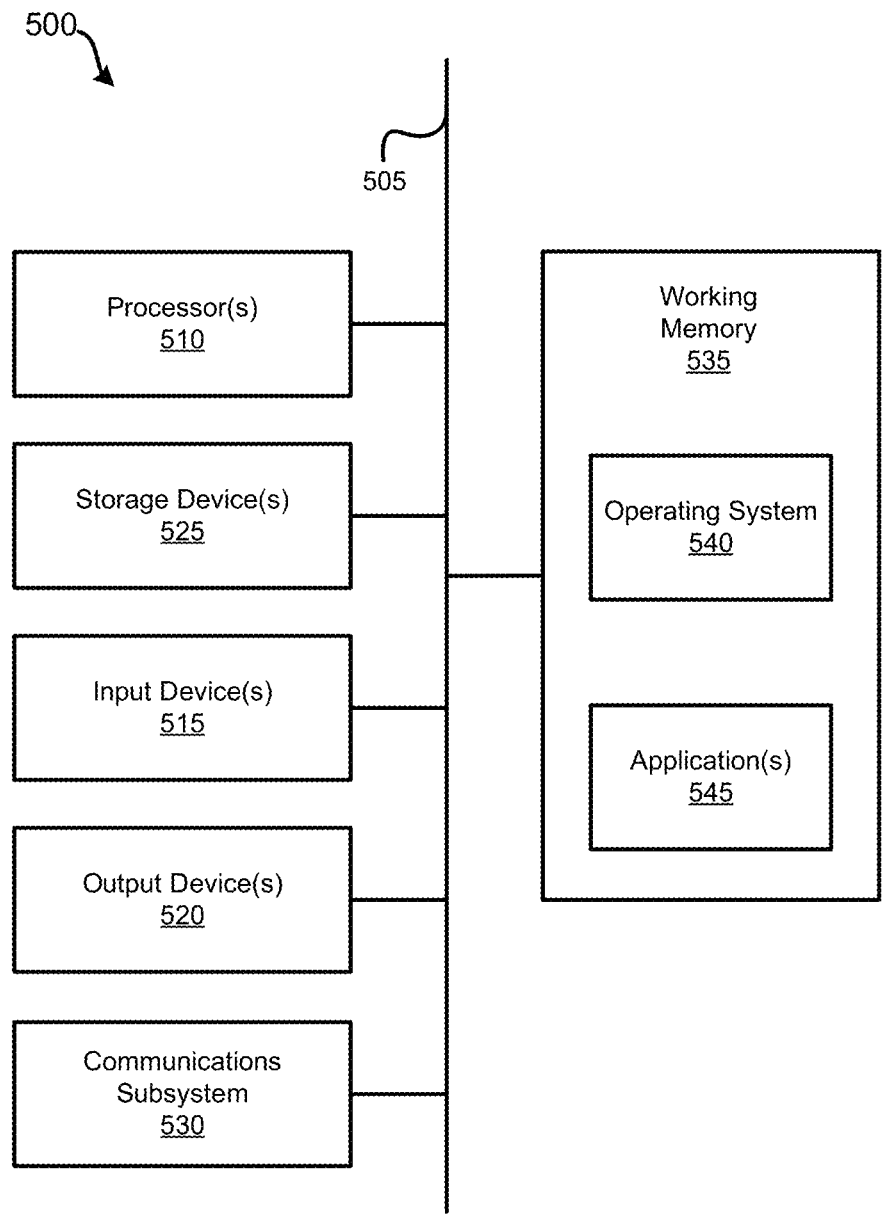
FIG. 5 illustrates an embodiment of a computer system that may be incorporated as part of the described computerized devices, in accordance with certain embodiments of the present disclosure.

A computer system as illustrated in FIG. 5 may be incorporated as part of the previously described computerized devices, such as a television receiver or television service provider system. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a keyboard, remote control, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method comprising:
   receiving a plurality of particularized content items;
   storing the plurality of particularized content items in a storage device;
   receiving first content that corresponds to at least one segment of a plurality of segments of video content;
   processing at least a portion of the at least one segment of the plurality of segments to detect:
      at least a first set of one or more characteristics of at least the portion, the first set of one or more characteristics corresponding to a first category of characteristics; and
      at least a second set of one or more characteristics of at least the portion, the second set of one or more characteristics corresponding to a second category of characteristics, where the second category of characteristics is different from the first category of characteristics;
   where the first category of characteristics and the second category of characteristics are from a plurality of categories of characteristics, the plurality of categories comprising two or more of a color category, an acoustic category, and/or a dialogue category;
   selecting a subset of the plurality of particularized content items based at least in part on:
      determining a score based at least in part on the first category of characteristics, the determining comprising scoring one or more matches according to matching of a third set of one or more characteristics to the first set of one or more characteristics of at least one portion of the subset of the plurality of particularized content items to the first set of one or more characteristics detected with the at least one segment of the plurality of segments;
      when the score does not satisfy a score threshold, selecting the subset of the plurality of particularized content items based at least in part on the second category of characteristics and matching a fourth set of one or more characteristics of at least one portion of the subset of the plurality of particularized content items to the second set of one or more characteristics detected with the at least one segment of the plurality of segments; and
   outputting the first content for display with a display device, then the subset of the plurality of particularized content items in succession so that display of the subset of the plurality of particularized content items directly follows display of a last portion of the at least one segment.

2. The method as recited in claim 1, further comprising:
   scoring one or more matches according to the matching of the fourth set of one or more characteristics to the second set of one or more characteristics.

3. The method as recited in claim 2, where the selecting the subset of the plurality of particularized content items comprises selecting a highest scored match based at least in part on the scoring.

4. The method as recited in claim 1, wherein the plurality of segments of video content is audiovisual content that corresponds to a television program or a movie, and the portion of the at least one segment of the plurality of segments is the last portion before an end of the at least one segment that corresponds to a scene of the television program or the movie that is directly before a break in the television program or the movie.

5. The method as recited in claim 1, where the first category is the color category and the second category is the acoustic category, and the method further comprises:
   processing at least the portion of the at least one segment of the plurality of segments to detect:
      at least the third set of one or more characteristics of at least the portion, the third set of one or more characteristics corresponding to a third category of characteristics, where the third category of characteristics is the dialogue category;
   where the selecting the subset of the plurality of particularized content items is further based at least in part on the third category of characteristics.

6. A media device comprising:
   one or more processors; and
   a memory communicatively coupled with and readable by the one or more processors and having stored therein processor-readable instructions which, when executed by the one or more processors, cause the one or more processors to perform:
   receiving a plurality of particularized content items;
   storing the plurality of particularized content items in a storage device;
   receiving first content that corresponds to at least one segment of a plurality of segments of video content;
   processing at least a portion of the at least one segment of the plurality of segments to detect:
      at least a first set of one or more characteristics of at least the portion, the first set of one or more characteristics corresponding to a first category of characteristics; and
      at least a second set of one or more characteristics of at least the portion, the second set of one or more characteristics corresponding to a second category of characteristics, where the second category of characteristics is different from the first category of characteristics;

where the first category of characteristics and the second category of characteristics are from a plurality of categories of characteristics, the plurality of categories comprising two or more of a color category, an acoustic category, and/or a dialogue category;

selecting a subset of the plurality of particularized content items based at least in part on:

determining a score based at least in part on the first category of characteristics, the determining comprising scoring one or more matches according to matching of a third set of one or more characteristics to the first set of one or more characteristics of at least one portion of the subset of the plurality of particularized content items to the first set of one or more characteristics detected with the at least one segment of the plurality of segments;

when the score does not satisfy a score threshold, selecting the subset of the plurality of particularized content items based at least in part on the second category of characteristics and matching a fourth set of one or more characteristics of at least one portion of the subset of the plurality of particularized content items to the second set of one or more characteristics detected with the at least one segment of the plurality of segments; and outputting the first content for display with a display device, then the subset of the plurality of particularized content items in succession so that display of the subset of the plurality of particularized content items directly follows display of a last portion of the at least one segment.

7. The media device as recited in claim 6, the one or more processors to further perform:

scoring one or more matches according to the matching of the fourth set of one or more characteristics to the second set of one or more characteristics.

8. The media device as recited in claim 7, where the selecting the subset of the plurality of particularized content items comprises selecting a highest scored match based at least in part on the scoring.

9. The media device as recited in claim 6, wherein the plurality of segments of video content is audiovisual content that corresponds to a television program or a movie, and the portion of the at least one segment of the plurality of segments is the last portion before an end of the at least one segment that corresponds to a scene of the television program or the movie that is directly before a break in the television program or the movie.

10. The media device as recited in claim 6, where the first category is the color category and the second category is the acoustic category, and the one or more processors to further perform:

processing at least the portion of the at least one segment of the plurality of segments to detect:

at least the third set of one or more characteristics of at least the portion, the third set of one or more characteristics corresponding to a third category of characteristics, where the third category of characteristics is the dialogue category;

where the selecting the subset of the plurality of particularized content items is further based at least in part on the third category of characteristics.

11. One or more non-transitory, machine-readable media having machine-readable instructions thereon which, when executed by one or more processing devices, cause the one or more processing devices to perform:

receiving a plurality of particularized content items;

storing the plurality of particularized content items in a storage device;

receiving first content that corresponds to at least one segment of a plurality of segments of video content;

processing at least a portion of the at least one segment of the plurality of segments to detect:

at least a first set of one or more characteristics of at least the portion, the first set of one or more characteristics corresponding to a first category of characteristics; and at least a second set of one or more characteristics of at least the portion, the second set of one or more characteristics corresponding to a second category of characteristics, where the second category of characteristics is different from the first category of characteristics;

where the first category of characteristics and the second category of characteristics are from a plurality of categories of characteristics, the plurality of categories comprising two or more of a color category, an acoustic category, and/or a dialogue category;

selecting a subset of the plurality of particularized content items based at least in part on:

determining a score based at least in part on the first category of characteristics, the determining comprising scoring one or more matches according to matching of a third set of one or more characteristics to the first set of one or more characteristics of at least one portion of the subset of the plurality of particularized content items to the first set of one or more characteristics detected with the at least one segment of the plurality of segments;

when the score does not satisfy a score threshold, selecting the subset of the plurality of particularized content items based at least in part on the second category of characteristics and matching a fourth set of one or more characteristics of at least one portion of the subset of the plurality of particularized content items to the second set of one or more characteristics detected with the at least one segment of the plurality of segments; and outputting the first content for display with a display device, then the subset of the plurality of particularized content items in succession so that display of the subset of the plurality of particularized content items directly follows display of a last portion of the at least one segment.

12. The one or more non-transitory, machine-readable media as recited in claim 11, the one or more processing devices further to perform:

scoring one or more matches according to the matching of the fourth set of one or more characteristics to the second set of one or more characteristics.

13. The one or more non-transitory, machine-readable media as recited in claim 12, where the selecting the subset of the plurality of particularized content items comprises selecting a highest scored match based at least in part on the scoring.

14. The one or more non-transitory, machine-readable media as recited in claim 11, wherein the plurality of segments of video content is audiovisual content that corresponds to a television program or a movie, and the portion of the at least one segment of the plurality of segments is the last portion before an end of the at least one segment that corresponds to a scene of the television program or the movie that is directly before a break in the television program or the movie.

* * * * *